United States Patent [19]
Guy

[11] Patent Number: 5,690,818
[45] Date of Patent: Nov. 25, 1997

US005690818A

[54] SPRAY SLUDGE SUPPRESSION SYSTEM

[76] Inventor: Monroe Wayne Guy, 12107 Lake Lora Cir., Baton Rouge, La. 70816

[21] Appl. No.: 637,850

[22] Filed: Apr. 25, 1996

[51] Int. Cl.⁶ .................... B08B 3/02; B01D 21/30
[52] U.S. Cl. ............ 210/139; 210/138; 210/198.1; 210/205; 210/207
[58] Field of Search .................... 210/138, 139, 210/198.1, 205, 207; 134/137; 137/15, 563

[56] References Cited

U.S. PATENT DOCUMENTS 4,642,138  2/1987  Koyase et al. .................... 137/15

*Primary Examiner*—David A. Reifsnyder
*Attorney, Agent, or Firm*—Roy, Kiesel & Tucker

[57] ABSTRACT

In a waste water treatment system having a container and waste water disposed therein, an apparatus for treating a sludge blanket comprising at least one spray assembly, the spray assembly fluidly connected to a source of fluid, the spray assembly having a spray head positioned above the waste water, the spray head being adapted to spray fluid such that when fluid is sprayed from the spray head, the sprayed fluid will suppress a sludge blanket on the waste water.

6 Claims, 2 Drawing Sheets

SPRAY SLUDGE SUPPRESSION SYSTEM

BACKGROUND OF THE INVENTION

1. Field of the Invention

This invention relates, generally, to the treatment of waste water, and more particularly to the suppression of the sludge blanket which accumulates in residential treatment systems.

2. Prior Art

Numerous devices are known in the art for the treatment of waste water. Most devices have a configuration which includes a tank or container, an inlet for feeding the waste water into the tank, and an outlet for letting the treated water out and a cover for the tank. Some treatment systems include pipes for injecting air into the waste water in the tank to assist in the aerobic treatment of the fluid. One such example is shown in U.S. Pat. No. 4,975,197. Some systems have a vertical clarifying structure within the tank, such as that shown in U.S. Pat. No. 5,269,911.

A problem with all of these treatment systems is that particles which rise from the waste water form a layer of scum or sludge on the surface of the waste water. This layer of sludge can be composed of floatables, or particles of less density than the waste water, combined with gas bubbles, and non-floatables, particles of greater density than the waste water, combined with gas bubbles. The problem with the sludge layer is that the accumulated sludge can find its way into the outlet and exit with the treated effluent, which is otherwise clear and odorless. Maintenance of treatment systems usually involves periodically vacuuming the system to remove particulate matter in the system, including the floating sludge layer. It is desirable to reduce the frequency of vacuuming.

Some past attempts to deal with the problem of sludge discharge have not been without drawbacks; one such method attempted to treat the sludge separately, but such separate treatment requires a more elaborate and expensive treatment system. Another method to reduce the sludge discharge involved placing the intake for the discharge or outlet pipe below the surface of the waste water in the tank. Placing the intake below the surface lessens the frequency of sludge discharge but does not eliminate the problem in treatment systems having covered tanks. The problem remains because the layer of sludge which floats on the surface of the waste water is of such an extent that the blanket begins to accumulate downwardly, below the surface of the water. Sufficient buildup will eventually reach the level of the outlet pipe, causing the sludge to exit through the outlet pipe.

OBJECTS OF THE INVENTION

It is an object of the present invention to provide a simple inexpensive waste water treatment device which will help reduce the discharge of sludge from the discharge outlet.

Another object of the present invention is to provide a waste water treatment device which deals with sludge accumulation without using a separate chamber for treatment of the sludge.

Another object of the present invention is to provide a waste water treatment device which will lessen the frequency of surface vacuuming maintenance.

SUMMARY OF THE INVENTION

A waste water treatment device is disclosed. The device includes a vertically oriented cylindrical tank with a cover. Free space is provided between the surface of the waste water and the top of the tank. At least one spray head is provided, disposed in the free space between the top of the tank and the surface of the waste water in the tank. The spray head is connected to a source of fluid; periodical spraying of fluid onto or through any accumulated sludge particles will keep the sludge layer from building up. The sprayed fluids will be captured in the sludge blanket, causing an increase in density of the sludge blanket, reducing the floatability of the sludge blanket until it no longer floats. The sludge layer will thus sink into the waste water and be treated further.

DETAILED DESCRIPTION

Figure 1:
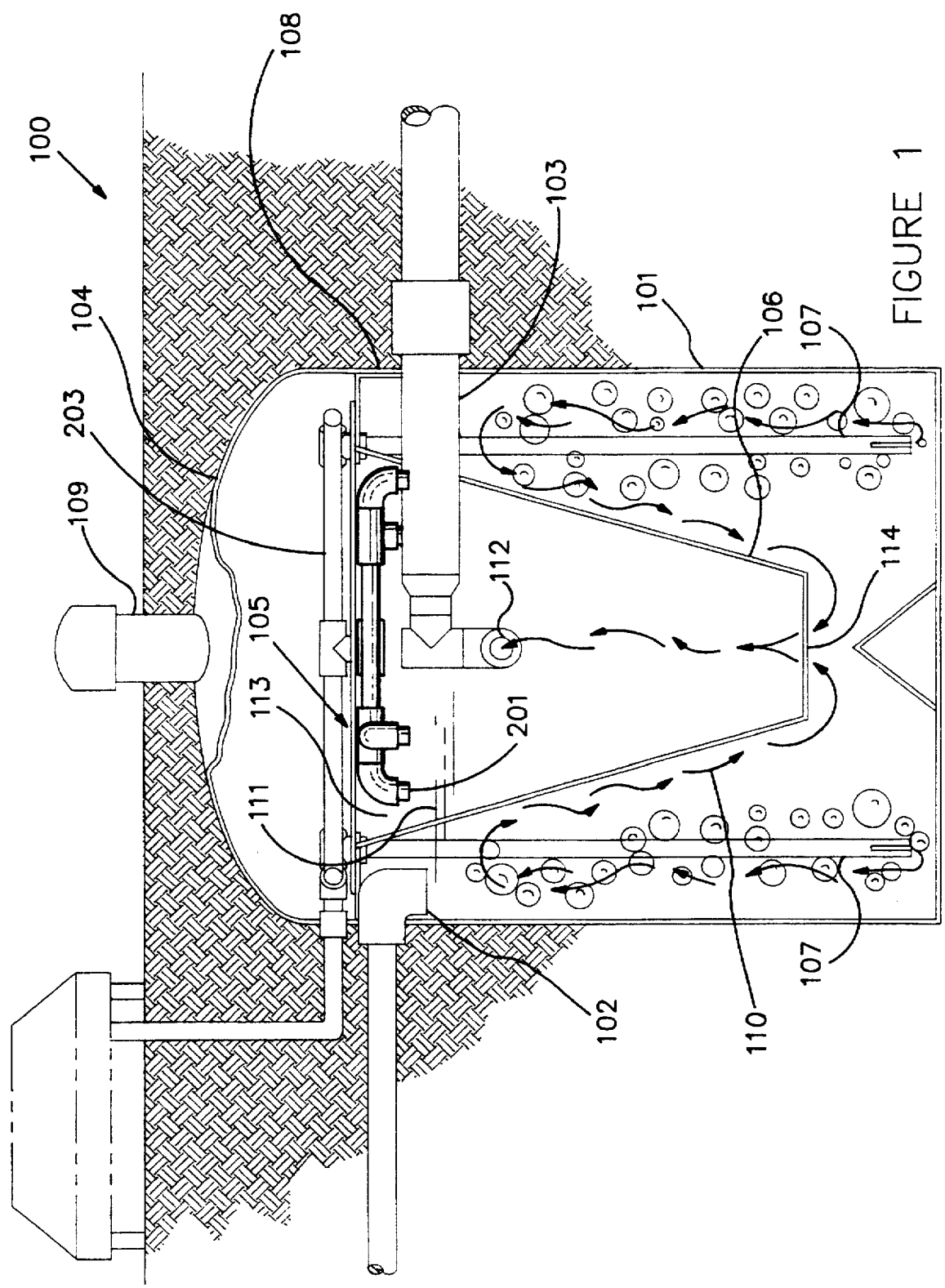
FIG. 1 is a sectional view of the invention taken in a vertical plane which bisects an embodiment of the treatment apparatus.

FIG. 1 is a sectional view of the invention in a vertical plane which bisects the treatment apparatus 100. The invention is shown in this figure as being incorporated into a waste water treatment system which includes a clarifying chamber 106 within the tank 101. It is to be understood that the invention can be practiced without the clarifier 106, or alternatively, with a waste water system having a clarifier 106 which is separate from the tank 101. Further, it is to be understood that some waste water treatment systems have an open top, and thus lack a cover 104.

The main components of treatment apparatus 100 are tank 101, inlet 102, outlet 103, cover 104, and spray assembly 105. In the embodiment depicted treatment apparatus 100 also includes clarifier 106 and air injectors 107. Tank 101 is depicted as a vertically oriented cylindrical vessel although the invention could also be practiced in tanks of other shapes such as a cube. Tank 101 may be constructed of any strong water resistant material including but not limited to concrete, fiberglass, polyethylene, PVC, or steel. Tank 101 is covered at upper end 108 by cover 104. Cover 104 is high enough above upper end 108 to allow for placement of spray assembly 105 between cover 104 and surface 111 of waste water 110 in tank 101. Cover 104 will have top opening 109 which may be used for servicing of treatment apparatus 100 without the need to completely remove cover 104.

Waste water 110 enters tank 101 via inlet 102. Waste water 110 is treated in tank 101 by the action of aerobic organisms. In the embodiment shown, the growth of aerobic organisms is assisted by air injectors 107. As waste water 110 is treated some particles within waste water 110 will float to surface 111. If enough particles are allowed to accumulate a sludge layer will form on the surface 111. Outlet 103 has at least at least one submerged opening 112 through which waste water 110 may exit tank 101. Submerged opening 112 is located a sufficient distance below surface 111 so as to prevent any accumulated sludge from entering submerged opening 112. Clarifier 106, although not required to practice the invention, assists in the more complete treatment of waste water 110 by causing greater circulation of waste water 110 as shown by the arrows in FIG. 1. Clarifier 106 may be either pyramid-shaped or cone-shaped, as depicted here, and has clarifier top opening 113 which is a bigger opening than clarifier bottom opening 114. Clarifier 106 is constructed so that clarifier top opening 113 will be above surface 111 of waste water 110.

Figure 2:
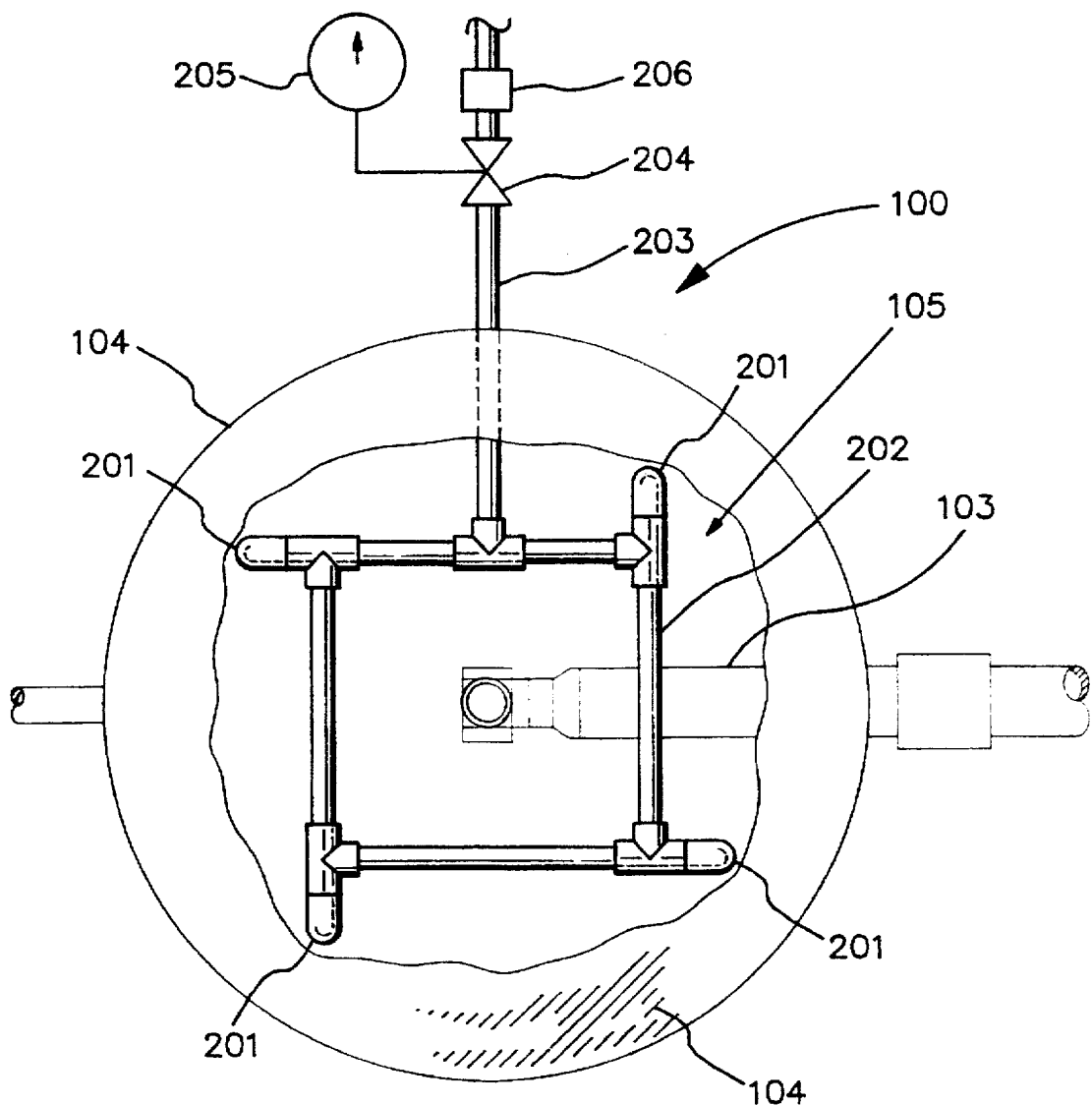
FIG. 2 is a perspective view of the invention from above the treatment apparatus. The top of the treatment apparatus has been cut away to show the sludge sprayer assembly.

FIG. 2 is a top view of treatment apparatus 100 in which a portion of cover 104 has been cut away to reveal spray assembly 105. Spray assembly 105 includes one or more spray heads 201, manifold 202, and supply line 203. As shown, spray heads 201 are conventional garden sprinkler nozzles, although any type of structure suitable for diverting the stream of fluid onto the sludge layer could be used. The fluid utilized by the spray assembly 105 can be fresh water at normal household water pressure, obtained by connecting supply line 203 to the household fresh water supply. Backflow prevention valve 206 may be connected between sprayer assembly 105 and the household fresh water supply (not shown). Although not required for operatibility, backflow prevention valve 206 can be provided. As shown, prevention valve 206 is a conventional anti-siphon valve which prevents waste water from being siphoned into the household fresh water supply. The system operates by spraying fluid through the spray head 201. The sprayed fluid is captured in the floating sludge blanket, causing an increase in density of the sludge blanket and/or the bursting of gas bubbles trapped in the sludge blanket, and thereby reducing the floatability of the sludge blanket. If sufficient fluid is captured or gas bubbles burst, a portion of the sludge layer will sink into the waste water for further treatment; the amount of fluid needed to substantially suppress the sludge blanket is that amount needed to keep the sludge blanket from entering the waste water outlet of the treatment system.

The amount of fluid spray needed to substantially suppress the sludge blanket build up will depend upon the capacity of the waste water system, and the types of waste present in the waste water 110. For example, in a residential application for a family of four (400–1500 gallon capacity) activation of the sprayer assembly 105 for approximately 3–5 minutes per hour, utilizing a flow of approximately ½ g.p.m. has been found effective. For treatment system as having a large surface area of exposed waste water, it may be desirable to utilize more than one spray head 201. The effectiveness of the spray fluid in suppressing the sludge blanket depends on the amount of fluid sprayed, but not the size of the droplets of sprayed fluid.

In the embodiment shown, control valve 204 and timer 205 are used to activate sprayer assembly 105. Timer 205 and control valve 204 are conventional devices used to control the flow of fluid through the sludge suppression system, such as those used in garden sprinkle, applications. Control valve 204 could consist of a first valve for starting or stopping flow, and a second valve placed in series with first valve for adjusting the amount of flow; alternatively, control valve 204 may be a single on/off valve with the ability to regulate or adjust the amount of flow when in the on position. Preferably, timer 205 will be set to activate sprayer assembly 105 at a frequency and for a duration sufficient to suppress any sludge layer. One could also practice the invention without timer 205 or control valve 204. A manually operated valve would be placed between the household fresh water supply and sprayer assembly 105. The resident would then manually activate sprayer assembly 105 at an appropriate frequency and duration.

Although in the embodiment depicted household fresh water is used as the fluid sprayed by sprayer assembly 205, one skilled in the art could use other fluids including but not limited to rainwater or even effluent which has been discharged from treatment apparatus 100, although to use rainwater or effluent the fluid would have to be pressurized by use of a pump. Also, one could treat any of the possible fluids with chemicals to aid in the breakdown of the sludge. There are of course other alternate embodiments which are obvious from the foregoing descriptions of the invention which are is intended to be included within the scope of the invention as defined by the following claims.

I claim:

1. In a waste water treatment system having a container and waste water disposed therein, said container having a cover, said waste water having a waste water/air interface located below said cover, said waste water having waste particles positioned therein, some of said particles being floatable on said waste water/air interface and combinable to form a sludge blanket, an apparatus for treating said sludge blanket comprising at least one spray assembly, said spray assembly fluidly connected to a source of fluid, said spray assembly having a spray head positioned inside said container and above said waste water/air interface, said spray head being adapted to spray fluid such that when fluid is sprayed from said spray head, said sprayed fluid will substantially suppress said sludge blanket on said waste water.

2. An apparatus according to claim 1 wherein said spray assembly further has a control valve, said control valve operatively connected to said spray head in order to control the flow of fluid to said spray head.

3. An apparatus according to claim 2 wherein said spray assembly further has a timer, said timer operatively connected to said control valve.

4. In a waste water treatment system having a container and waste water disposed therein, said waste water treatment system further having a clarifier area, said clarifier area fluidly connected to said container, said clarifier having waste water disposed therein, said waste water in said clarifier area having a waste water/air interface area, said waste water in said clarifier having waste particles positioned therein, some of said particles being floatable on said waste water/air interface and combinable to form said sludge blanket, an apparatus for treating a sludge blanket comprising at least one spray assembly, said spray assembly fluidly connected to a source of fluid, said spray assembly having a spray head positioned above said waste water in said clarifier area, said spray head being adapted to spray fluid such that when fluid is sprayed from said spray head, said sprayed fluid will substantially suppress a sludge blanket in said clarifier area.

5. An apparatus according to claim 4 wherein said spray assembly further has a control valve, said control valve operatively connected to said spray head in order to control the flow of fluid to said spray head.

6. An apparatus according to claim 5 wherein said spray assembly further has a timer, said timer operatively connected to said control valve.

* * * * *